US008651011B2

(12) United States Patent
Sinzig (10) Patent No.: US 8,651,011 B2
(45) Date of Patent: Feb. 18, 2014

(54) BREWING DEVICE FOR A COFFEE MACHINE

(75) Inventor: Peter Sinzig, Moosseedorf (CH)

(73) Assignee: Schaerer AG, Zuchwil (CH)

( * ) Notice: Subject to any disclaimer, the term of this patent is extended or adjusted under 35 U.S.C. 154(b) by 863 days.

(21) Appl. No.: 12/674,166

(22) PCT Filed: Sep. 4, 2008

(86) PCT No.: PCT/EP2008/061666
§ 371 (c)(1),
(2), (4) Date: Aug. 9, 2010

(87) PCT Pub. No.: WO2009/034002
PCT Pub. Date: Mar. 19, 2009

(65) Prior Publication Data
US 2011/0185909 A1   Aug. 4, 2011

(30) Foreign Application Priority Data

Sep. 12, 2007 (EP) .................................... 07116211

(51) Int. Cl.
*A47J 31/00* (2006.01)
(52) U.S. Cl.
USPC ........................... 99/287; 99/289 R; 99/302 R
(58) Field of Classification Search
USPC ................. 99/287, 289 R, 297, 302 R, 302 P
See application file for complete search history.

(56) References Cited

U.S. PATENT DOCUMENTS

| 5,333,537 A * | 8/1994 | Lussi et al. ....................... 99/287 |
| 2006/0151453 A1 * | 7/2006 | Gordon et al. ........... 219/137.61 |

FOREIGN PATENT DOCUMENTS

EP    0528758 A    2/1993

OTHER PUBLICATIONS

International Search Report dated Nov. 27, 2008.

* cited by examiner

*Primary Examiner* — Brian Jennison
(74) *Attorney, Agent, or Firm* — Pearne & Gordon LLP (57) ABSTRACT

A brewing device (1) for a coffee machine comprises a brewing cylinder (6) with a cylindrical hole and two pistons (3, 4) by means of which the brewing cylinder (6) can be closed off in order to form a brewing chamber (12). The brewing cylinder (6) and the pistons (3 and 4) are held in a frame (2), in a way displaceable relative to one another, and are drivable via a drive device (9, 10). This drive device (9, 10) comprises a spindle (9), the two ends of which are designed as bearing pins (25), and are mounted such that they are rotatable in a sliding way in bearing rings (26, 27) fitted in the frame (2). At least one supporting element (28) is inserted in at least one of the bearing rings (26), and is pressible substantially radially against the bearing pin (25) by means of a spring element (37). The bearing play between bearing ring (26) and bearing pin (25) is thereby compensated; a silent operation of the spindle in the brewing device results.

12 Claims, 5 Drawing Sheets

BREWING DEVICE FOR A COFFEE MACHINE

This invention relates to a brewing device for a coffee machine, comprising a brewing cylinder with a cylindrical bore and two pistons, by means of which pistons the brewing cylinder is able to be closed off to form a brewing chamber, the brewing cylinder and the pistons being held in a frame in a way dis-placeable relative to one another and being drivable via a drive device, which drive device comprises a spindle, both ends of which are designed as bearing pins and are rotatably borne in a sliding way in bearing rings mounted in the frame, a coffee powder supply device for filling of the brewing chamber with coffee powder, and means for leading away the coffee powder cake, ejected from the brewing chamber by a piston after the brewing procedure, into a collection container.

Brewing devices of this kind are known in diverse designs, and are used both in household coffee makers and in restaurant coffee machines. To dispense a coffee, regardless of which type of coffee is being dispensed, such as, for instance, normal coffee, espresso coffee, ristretto coffee, etc., the necessary amount of coffee powder, usually freshly ground, is filled into the brewing chamber. The brewing chamber is subsequently closed, after which hot water is conducted at the desired pressure through the brewing chamber, coffee being brewed. The thus freshly brewed coffee reaches the provided vessel via an outlet. The brewing chamber is then opened. The coffee powder residue located therein is ejected from the brewing chamber, and ends up in a container.

Such a brewing device is known from EP-A 0 528 758, for example. A spindle is arranged for opening and closing of the brewing chamber, which spindle is drivable in rotation via a drive motor. Via this spindle, which is provided with a threading, the brewing cylinder is displaced along this spindle. To this end, the brewing cylinder is equipped with a carrying part which is provided with a threading that engages in the threading of the spindle, and which wraps around the spindle by a certain range.

The spindle is provided with a bearing pin at both its ends, which bearing pins are rotatably held in a sliding way in bearing rings, which are mounted in the frame of the brewing device. The spindle with the bearing pins as well as the frame and the further components of the brewing device are made of an abrasion-resistant plastic, in particular POM (polyoxymethylene), and are produced with an injection molding method. In this injection molding method, with which the individual parts can be produced relatively cost-effectively, tolerance ranges cannot be kept that are precise enough as would be needed in the case of the dimensions for the bearings of the spindle in order to obtain as minimal play as possible, for example. Owing to the relatively large amount of play between bearing pins and bearing rings, a noise occurs during rotational drive of the spindle, which noise is perceived as annoying. Owing to the relatively large tolerance during the manufacturing process, instances of lack of balance can also arise, resulting in a rumbling noise, which is likewise annoying.

The object of the present invention thus consists in developing the bearing designs for this spindle in such a way that the noises described above can be avoided.

The object is achieved according to the invention in that at least one supporting element is inserted into at least one of the bearing rings, which supporting element is pressible substantially radially against the bearing pin by means of a spring element.

Achieved with this supporting element is that the bearing pin is pressed against the bearing ring on the side opposite the supporting element, whereby a bearing design practically free of play is obtained, and whereby the noises, described in the foregoing, which arise without supporting elements, can be avoided in a simple way.

Preferably the supporting element is designed as sliding member with a sliding surface, which member is inserted into a recess in the bearing ring and whose sliding surface is pressible on the lateral surface of the bearing pin. A very simple and cost-effective solution is thereby obtained.

Preferably, the spring element is designed as compression spring, which, in a simple way, is supported with the one end on the sliding member, while the other end is supported in a way fixed to the frame.

A further advantageous embodiment of the invention consists in that the recess in the bearing ring is designed as continuous bore, the external opening of which is able to be closed off with a cover, which is able to be fixed to the frame, so that the other end of the compression spring is supported on this cover. The supporting element can thereby be brought into the mounted position in a simple way.

Preferably, the sliding member has the shape of a cup, whose bottom forms the sliding surface, which is directed against the bearing pin and whose walling is guided in the recess. An optimal fit of the supporting element in the bearing ring is thereby achieved, whereby an optimal functioning is ensured.

Preferably, the supporting element is made of chromium steel, an optimal sliding and a minimal abrasion being achieved.

Preferably, the sliding surface of the sliding member is designed as flat surface, which also makes possible a simple manufacture, in addition to an optimal functioning; a positioning of this supporting element in the recess is not necessary.

An embodiment of the brewing device according to the invention will be explained more closely in the following, by way of example, with reference to the attached drawing.

Shown are.

As can be seen from FIGS. 1 to 4, the brewing device 1 comprises an upper piston 3 held in a stationary way in the frame 2. Disposed axially opposite the upper piston 3 is a lower piston 4, which is axially displaceable with respect to the upper piston 3. This lower piston 4 is held in a cylindrical bore 5 of a brewing cylinder 6, which brewing cylinder 6 is likewise axially displaceable. The brewing cylinder 6 is provided with a threading 7, which will be described later in detail, which is engaged with a threading 8 of a spindle 9 rotatably held in the frame 2. This spindle 9 has on both ends one bearing pin 25 each, which are rotatably held in a sliding way in upper bearing ring 26 and lower bearing ring 27 mounted in the frame 2. It can be seen from FIGS. 1 to 4 that a supporting element 28 is inserted in the upper bearing ring 26, which supporting element will be described later in detail. The spindle 9 is drivable in a known way via an electromotor 10, which is likewise installed on the frame 2.

Figure 1:
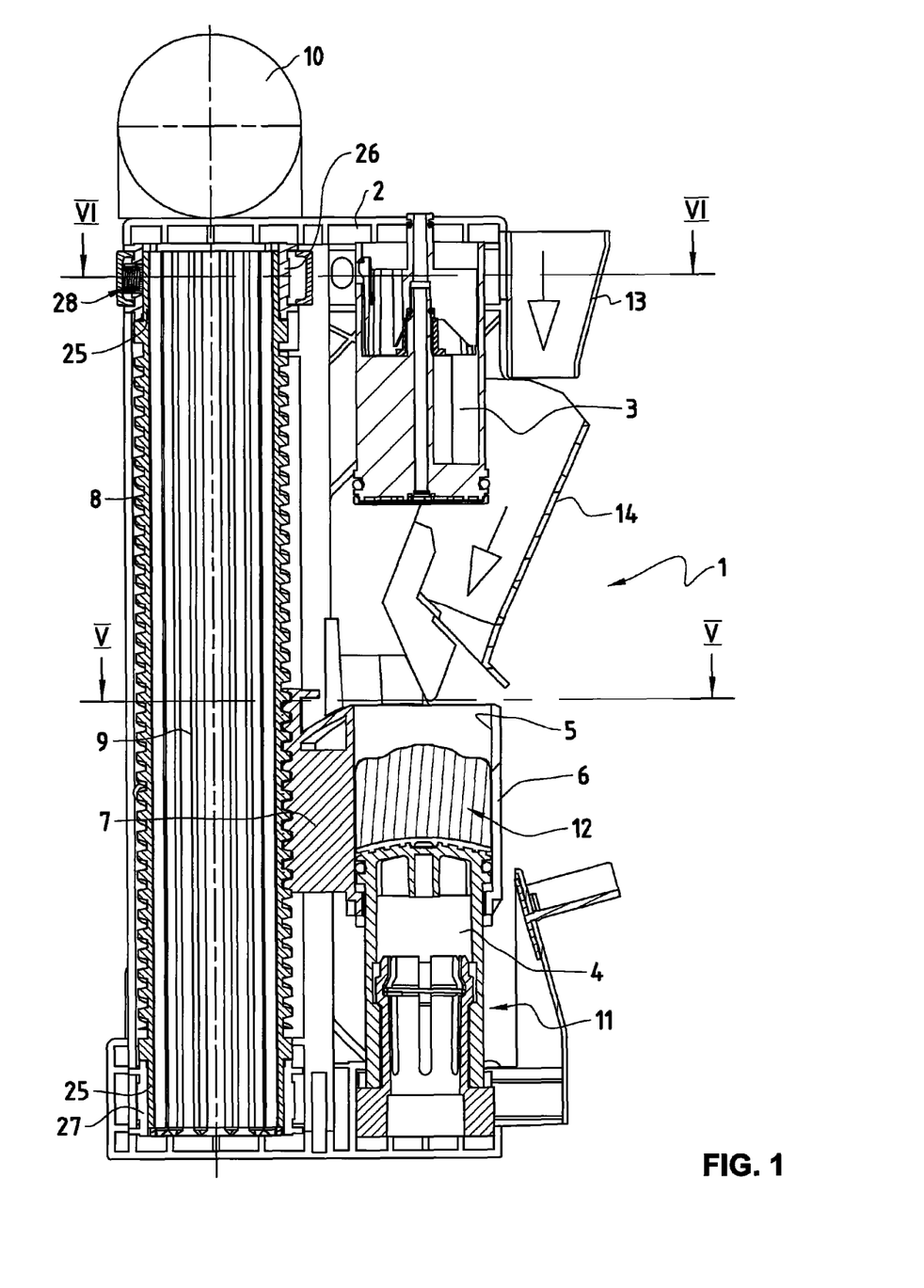
FIG. 1, a sectional representation of the brewing device of a coffee machine during the procedure of filling coffee powder into the brewing chamber.

Shown in FIG. 1 is the brewing device 1 in the filling position. This means that the lower piston 4 is situated in the lowermost position, in which it is held by the catch device 11 attached to the frame 2. This position was reached by the lower piston 4 in that the brewing cylinder 6 has likewise been brought into the lowermost position, via the spindle 9, by corresponding rotation, into which position the lower piston 4 is taken along until it is engaged in the catch device 11. Afterwards the brewing cylinder 6 is driven upward again through corresponding turning of the spindle 9, as can be seen in FIG. 1. The lower piston has thereby remained in the lowermost position. The brewing cylinder 6 has thus raised itself in relation to the lower piston 4, whereby formed within the brewing cylinder 6 is the brewing chamber 12, closed off downward by the lower piston 4.

The freshly ground coffee powder is now fed into this brewing chamber 12. This coffee powder is ground in a known way in a coffee mill, which is not shown and is likewise accommodated in the corresponding coffee machine. Via a first funnel 13, the powder reaches a pivotable funnel 14, through which the ground coffee powder is led into the brewing chamber 12. The coffee powder quantity supplied is hereby metered in a known way, depending upon which type of coffee is supposed to be dispensed.

Figure 2:
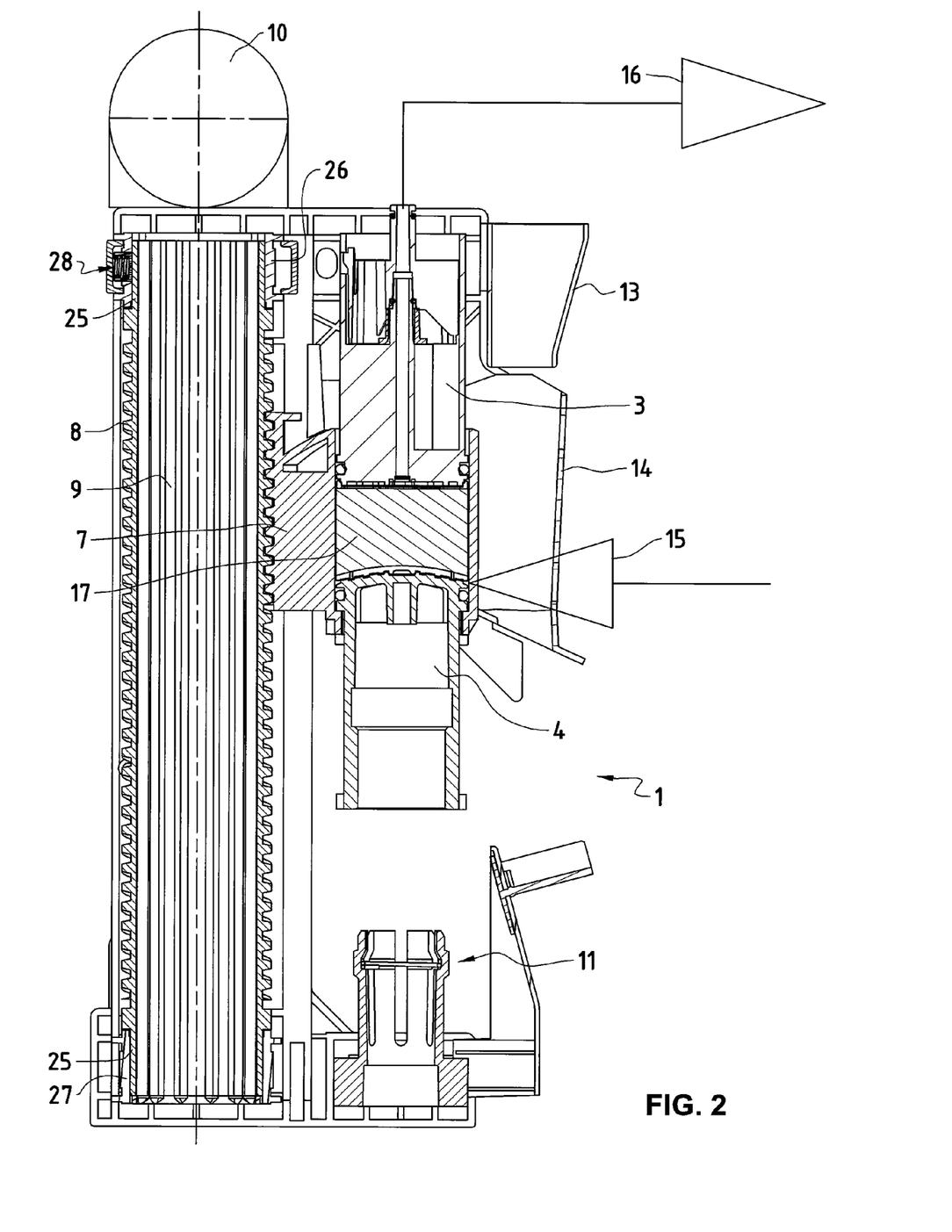
FIG. 2, a sectional representation of the brewing device with closed brewing chamber during the brewing operation for a coffee.

After filling the brewing chamber 12 with freshly ground coffee powder, the spindle 9 is set in rotation via the electromotor 10; the brewing cylinder 6 is driven upwards via the threaded part 2, the lower piston 4 being carried along via corresponding tappets. The brewing cylinder 6 and the lower piston 4 are driven upward until the brewing chamber 12 is closed off by the upper piston 3, and the coffee powder located in the brewing chamber 12 is pressed. The brewing position is reached in this position, which is shown in FIG. 2. The hot water can now be supplied from below into the brewing chamber 12 in a known way, as shown by the arrow 15. The hot water flows through the brewing chamber 12 and the ground coffee powder located therein, and is discharged as brewed coffee via a discharge channel which is provided in the upper piston 3 in a known way, as shown by arrow 16, and, via a line (not shown), reaches an outlet of the coffee machine in a known way and from there the vessel provided underneath. For brewing of the coffee, the coffee powder located in the brewing chamber 12 is compressed between the two pistons 3 and 4 such that this coffee powder offers resistance to the brewing water flowing through, so that the brewing water has to be pressed through the brewing chamber 12 at a pressure of about 8 bar. The leached coffee powder remains in the brewing chamber 12, and forms a coffee powder cake which is very compact and moist.

As can be seen from FIG. 2, the pivotable funnel 14 is pivoted away when the brewing cylinder 6 is driven upward, with the lower piston 4. For this purpose the pivotable funnel 14 is provided with spring (not shown), which is able to press the pivotable funnel 14 back into the position shown in FIG. 1.

Figure 3:
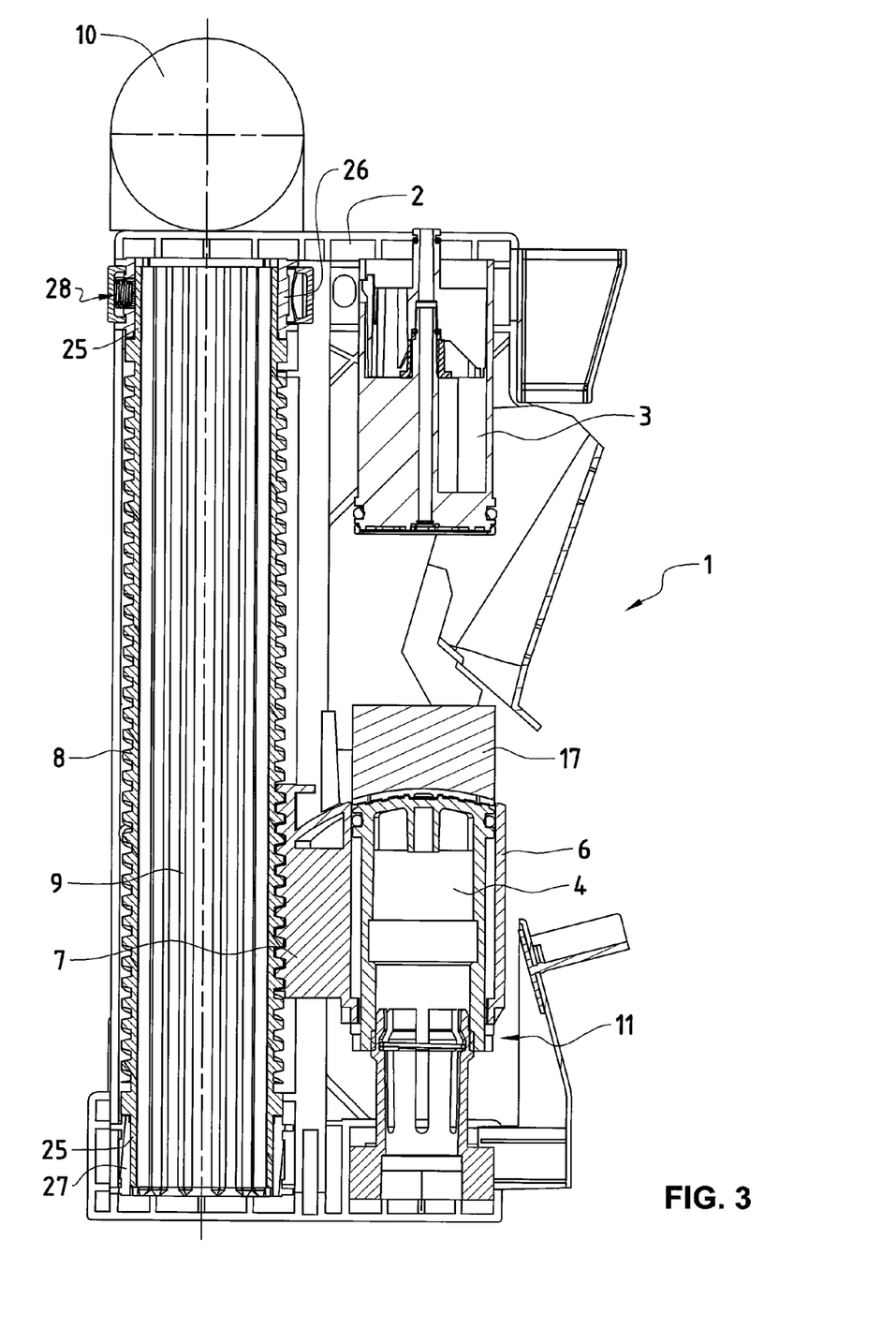
FIG. 3, a sectional representation of the brewing device with opened brewing chamber and coffee powder cake ejected by the lower piston.
Figure 4:
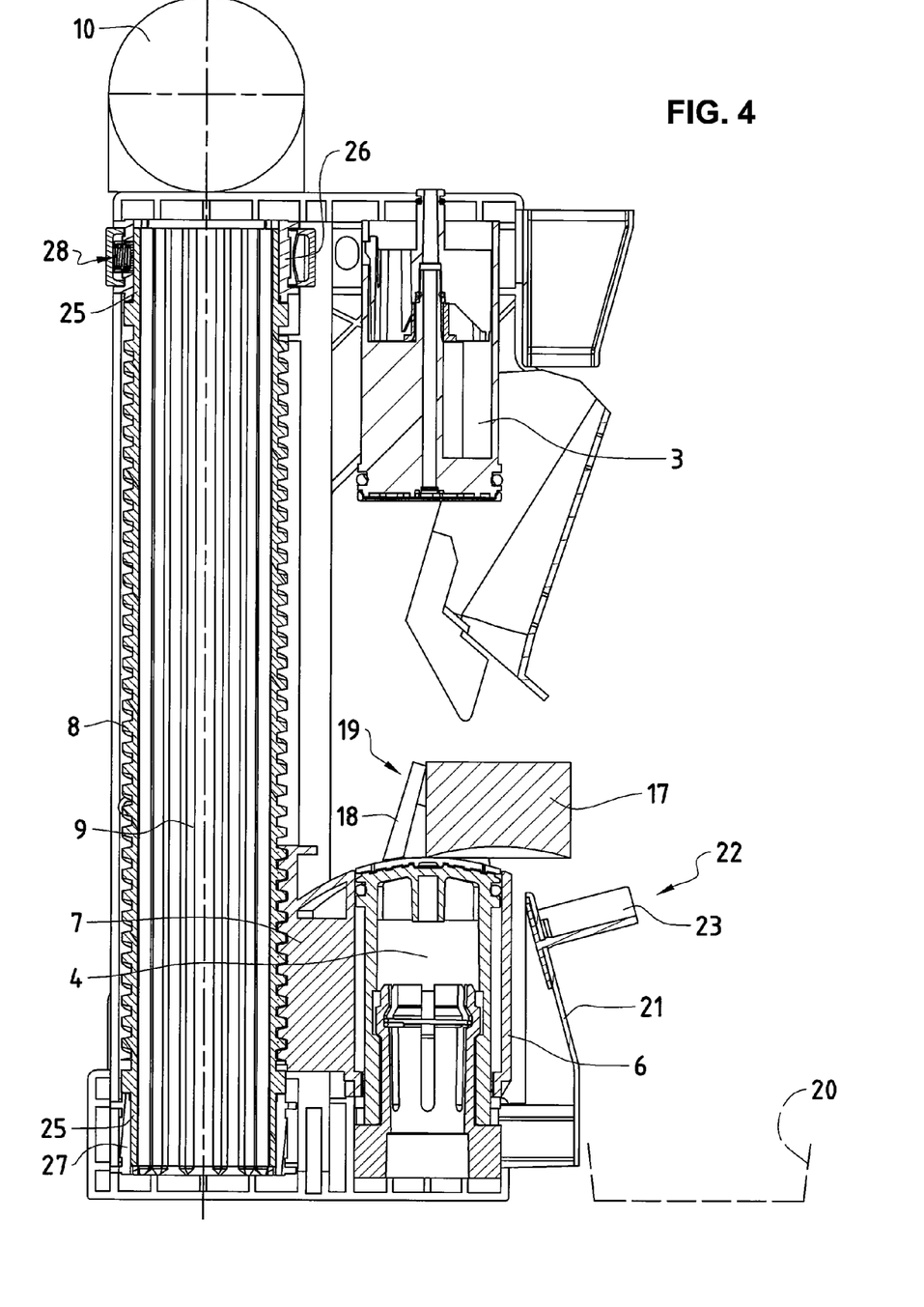
FIG. 4, a sectional representation of the brewing device with beginning of stripping of the coffee powder cake by the stripping device.

After carrying out of the brewing operation, the brewing chamber 12 is opened by the brewing cylinder 6 and the lower piston 4 being driven downward by corresponding rotation of the spindle 9, as shown in FIG. 3. The lower piston 4 hereby reaches, with its lower end, the catch device 11, and supports itself thereon. The brewing cylinder 6 is driven farther downward, and the lower piston 4 stands still, whereby the coffee powder cake 17 is ejected from the brewing cylinder 6, as can be seen in FIG. 3. When the brewing cylinder 6 has reached, with its upper edge, the upper edge of the lower piston 4, the lower piston 4 is carried along with the brewing cylinder 6 drivable farther downward via corresponding stops, and is driven into the catch device 11, as shown in FIG. 4. When the brewing cylinder 6 and the lower piston 4 reach the region of the lower position, a stripping element 18 of a stripping device 19 is actuated mechanically in a known way. The stripping element 18 hereby moves across the surface of the lower piston 4, and the coffee powder cake 17 is stripped off of the lower piston 4 and the brewing cylinder 6, as can be seen from FIG. 4.

Via a chute 21, which is attached to the frame 2, the coffee powder cake 17 thereby ends up in a container 20, shown only schematically, accommodated in the coffee machine. Installed on the chute 21 is a subcomponent 22, which is designed as a blade 23 in this embodiment example, by means of which the coffee powder cake 17 arriving in the container 20 via the chute 21 is cut up into smaller pieces.

After ejection of the coffee powder cake 17, the brewing cylinder 6 can be brought again into the filling position through corresponding rotation of the spindle 9, as shown in FIG. 1; the brewing device is ready to brew another coffee.

Figure 5:
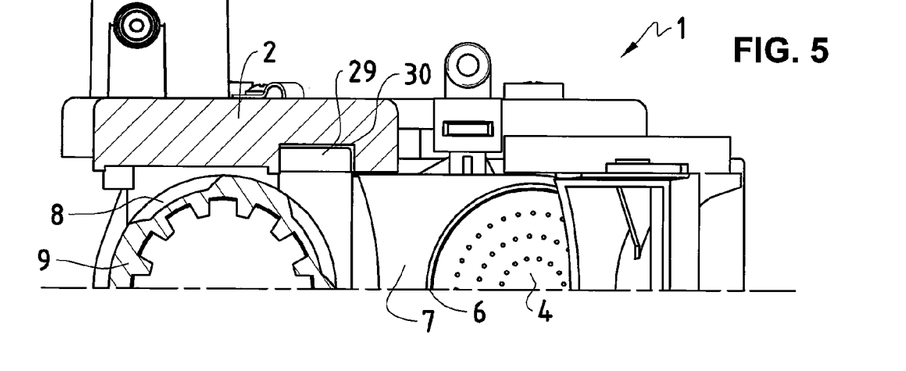
FIG. 5, a sectional representation of the brewing device along line V-V according to FIG. 1.

In FIG. 5, the frame 2 of the brewing device 1 is visible, in which the spindle 9 is rotatably held. Engaged in the threading 8 of the spindle 9 is the threaded part 7, to which the brewing cylinder 6 is attached. The threaded part 7 surrounds the threading 8 of the spindle 9 by less than 180 degrees; this part can thereby be produced in a simple way using an injection molding method. Inserted in the brewing cylinder 6 is the lower piston 4.

Provided on the threaded part 7 are guide ribs 29, which are guided along the spindle 9 in guide grooves 30 disposed in the frame 2. An optimal engagement of the threaded part 7 in the threading 8 of the spindle 9 is thereby ensured; moreover the threaded part 7 with the brewing cylinder 6 attached thereto is precisely guided.

Figure 6:
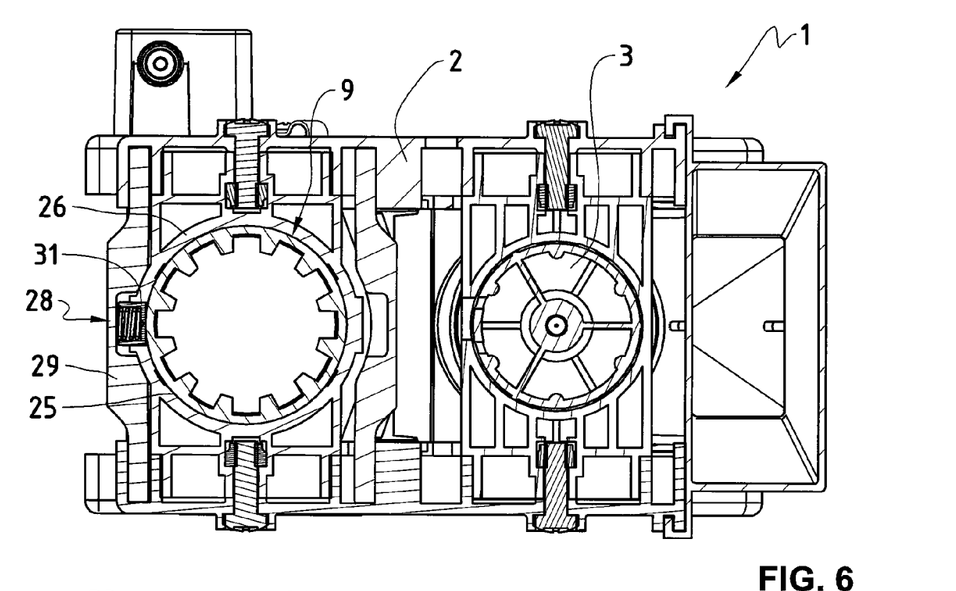
FIG. 6, a sectional representation of the brewing device along line VI-VI according to FIG. 1.

FIG. 6 shows the frame 2 of the brewing device 1 with the upper piston 3 held therein and the rotatably borne spindle 9 held in the frame. As has already been mentioned, this spindle 9 has at both ends a bearing pin 25, the upper bearing pin 25 being rotatably borne in the upper bearing ring 26, which is held in the frame 2. To reduce the bearing play between bearing pin 25 and bearing ring 26 and to prevent too great a noise emission from occurring, the upper bearing ring 26 is provided with a recess 31 in which the supporting element 28 is inserted, as can be seen in FIG. 6.

Figure 6A:
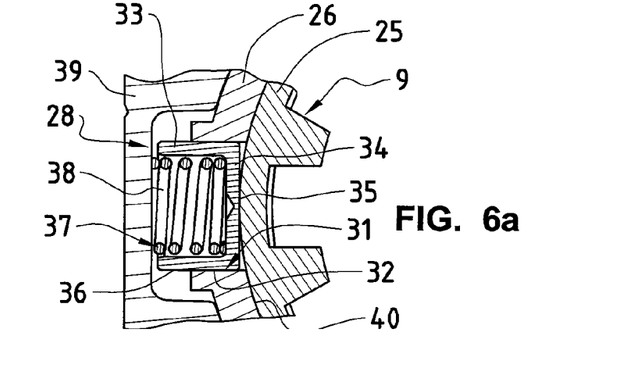
FIG. 6a, an enlarged representation of the supporting element according to FIG. 6.

As can be learned from the enlarged view of FIG. 6a, the recess 31 is designed as continuous bore 32 in the bearing ring 26. Inserted into this continuous bore 32 is the supporting element 28, which has the shape of a cup 33. The bottom 34 of this cup 33 forms the sliding surface 35, while the walling 36 of the cup 33 is guided in the continuous bore 32. Inserted into the interior space of this cup 33 is a spring element 37, which is designed here as compression spring 38. The one end of this compression spring 38 supports itself on the inner side of the bottom 34 of the cup 33, while the other end of this compression spring 38 is supported on a cover 39, which is held on the frame 2 of the brewing device 1, as can be seen from FIG. 6.

This compression spring 38 presses the cup 33 against the lateral surface 40 of the bearing pin 25. This bearing pin 25 is thereby pressed against the region of the bearing ring 26 opposite the supporting element 28; the bearing play is thereby eliminated, whereby a silent operation of the spindle is able to be achieved. The sliding surface 35 is designed here as flat surface, whereby achieved, in addition to an optimal ability to slide, is that the cup 33 does not have to be aligned with respect to the bearing ring, or respectively the lateral surface 40 of the bearing pin 25, and does not have to be secured against rotation.

The cup 33 is made of chromium steel in order to obtain optimal sliding characteristics between the supporting element 28 and the lateral surface 40 of the bearing pin 25 of the spindle 9.

Supporting elements 28 of this kind can be disposed in the upper bearing ring 26 and/or lower bearing ring 27. Such a supporting element 28 is preferably disposed in both bearing rings 26 and 27. Of course it is also conceivable, for example, for two supporting elements 28, which are offset at an angle with respect to one another, to be disposed per bearing ring 26, and/or 27, whereby a greater amount of play between bearing pin 25 and bearing rings 26 or 27 can be eliminated, if it occurs.

An optimal silent operation of the spindle in the bearing is achieved with this design of a brewing device according to the invention.

The invention claimed is:

1. A brewing device for a coffee machine, comprising a brewing cylinder with a cylindrical bore and two pistons, by means of which pistons the brewing cylinder is able to be closed off to form a brewing chamber, the brewing cylinder and the pistons being held in a frame in a way displaceable relative to one another and being drivable via a drive device, which drive device comprises a spindle, both ends of which are designed as bearing pins and are rotatable borne in a sliding way in bearing rings installed in the frame, a coffee powder supply device for filling the brewing chamber with coffee powder, and a device for leading away the coffee powder cake, ejected from the brewing chamber by a piston after the brewing procedure, into a collection container, wherein inserted into at least one of the bearing rings is at least one supporting element, which is pressible substantially radially against the bearing pin by means of a spring element, wherein the supporting element is designed as a sliding member with a sliding surface, which is inserted into a recess in the bearing ring and whose sliding surface is pressible on the lateral surface of the bearing pin, wherein the recess in the bearing ring is designed as continuous bore, the external opening of which is able to be closed off with a cover, which is able to be fixed to the frame, so that the other end of the spring element is supported on said cover.

2. The brewing device according to claim 1, wherein the spring element is designed as compression spring, whose one end is supported on the sliding member, and whose other end is supported on said cover.

3. A brewing device for a coffee machine, comprising a brewing cylinder with a cylindrical bore and two pistons, by means of which pistons the brewing cylinder is able to be closed off to form a brewing chamber, the brewing cylinder and the pistons being held in a frame in a way displaceable relative to one another and being drivable via a drive device, which drive device comprises a spindle, both ends of which are designed as bearing pins and are rotatable borne in a sliding way in bearing rings installed in the frame, a coffee powder supply device for filling the brewing chamber with coffee powder, and a device for leading away the coffee powder cake, ejected from the brewing chamber by a piston after the brewing procedure, into a collection container, wherein inserted into at least one of the bearing rings is at least one supporting element, which is pressible substantially radially against the bearing pin by means of a spring element, wherein the supporting element is designed as a sliding member with a sliding surface, which is inserted into a recess in the bearing ring and whose sliding surface is pressible on the lateral surface of the bearing pin, wherein the sliding member has the shape of a cup, whose bottom forms the sliding surface, which is directed against the bearing pin and whose walling is guided in the recess.

4. The brewing device according to claim 1, wherein the supporting element is made of chromium steel.

5. The brewing device according to claim 1, wherein the sliding surface of the sliding member is designed as a flat surface.

6. The brewing device according to claim 3, wherein the spring element is designed as compression spring, whose one end is supported on the sliding member, and whose other end is supported in a way fixed to the frame.

7. The brewing device according to claim 3, wherein the supporting element is made of chromium steel.

8. The brewing device according to claim 3, wherein the sliding surface of the sliding member is designed as a flat surface.

9. The brewing device of claim 1 wherein said device for leading away the coffee powder cake is a mechanically actuated stripping device with a stripping element that moves across a surface of the lower of said pistons.

10. The brewing device of claim 3 wherein said device for leading away the coffee powder cake is a mechanically actuated stripping device with a stripping element that moves across a surface of the lower of said pistons.

11. A brewing device for a coffee machine, comprising a brewing cylinder with a cylindrical bore and two pistons, by means of which pistons the brewing cylinder is able to be closed off to form a brewing chamber, the brewing cylinder and the pistons being held in a frame in a way displaceable relative to one another and being drivable via a drive device, which drive device comprises a spindle, both ends of which are designed as bearing pins and are rotatably borne in a sliding way in bearing rings installed in the frame, wherein inserted into at least one of the bearing rings is at least one supporting element, which is pressible substantially radially against the bearing pin by means of a spring element, wherein the supporting element is designed as a sliding member with a sliding surface, which is inserted into a recess in the bearing ring and whose sliding surface is pressible on the lateral surface of the bearing pin, wherein the sliding member has the shape of a cup, whose bottom forms the sliding surface, which is directed against the bearing pin and whose walling is guided in the recess.

12. A brewing device for a coffee machine, comprising a brewing cylinder with a cylindrical bore and two pistons, by means of which pistons the brewing cylinder is able to be closed off to form a brewing chamber, the brewing cylinder and the pistons being held in a frame in a way displaceable relative to one another and being drivable via a drive device, which drive device comprises a spindle, both ends of which are designed as bearing pins and are rotatably borne in a sliding way in bearing rings installed in the frame, wherein inserted into at least one of the bearing rings is at least one supporting element, which is pressible substantially radially against the bearing pin by means of a spring element, wherein the supporting element is designed as a sliding member with a sliding surface, which is inserted into a recess in the bearing ring and whose sliding surface is pressible on the lateral surface of the bearing pin, wherein the recess in the bearing ring is designed as continuous bore, the external opening of which is able to be closed off with a cover, which is able to be fixed to the frame, so that the other end of the spring element is supported on said cover.

* * * * *

UNITED STATES PATENT AND TRADEMARK OFFICE
CERTIFICATE OF CORRECTION

PATENT NO. : 8,651,011 B2 Page 1 of 1
APPLICATION NO. : 12/674166
DATED : February 18, 2014
INVENTOR(S) : Peter Sinzig It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this

Twenty-ninth Day of September, 2015

Michelle K. Lee
*Director of the United States Patent and Trademark Office*